Figure 1:
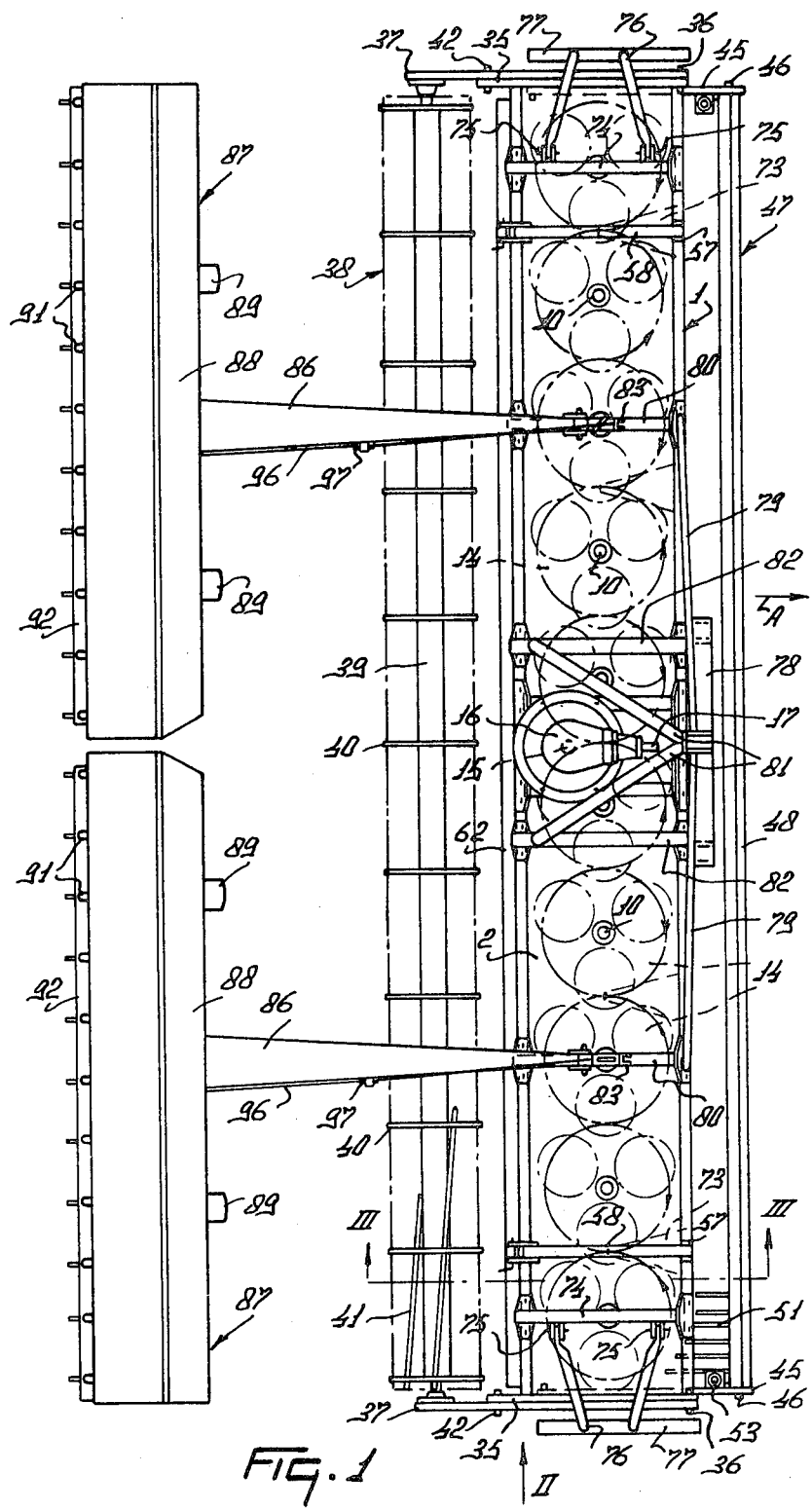

United States Patent [19]

van der Lely

[11] 4,088,084
[45] May 9, 1978

[54] SOIL CULTIVATING IMPLEMENTS

[76] Inventor: Cornelis van der Lely, 7, Brüschenrain, Zug, Switzerland

[21] Appl. No.: 728,118

[22] Filed: Sep. 30, 1976

[30] Foreign Application Priority Data

Sep. 30, 1975 Netherlands ............................ 7511481

[51] Int. Cl.² ............................ A01C 7/08; B60D 1/00
[52] U.S. Cl. ........................................... 111/52; 111/1; 172/59; 172/605; 172/677; 280/411 A
[58] Field of Search .................. 111/1, 8, 7, 6; 172/71, 172/195, 59, 677; 280/408, 423 R, 411 A

[56] References Cited

U.S. PATENT DOCUMENTS

| 3,177,828 | 4/1965 | Cramer | 172/149 |
| 3,396,685 | 8/1968 | Meiners | 111/7 |
| 3,752,092 | 8/1973 | Vinyard | 111/7 |
| 3,810,434 | 5/1974 | Lely | 172/59 |
| 4,014,272 | 3/1977 | Lely | 172/59 |
| 4,015,549 | 4/1977 | Brown | 111/8 |

Primary Examiner—Richard J. Johnson
Attorney, Agent, or Firm—Mason, Mason & Albright

[57] ABSTRACT

An implement attachment has a row of soil working members that are rotated about upwardly extending axes defined by shafts journalled in an elongated frame portion. One or more further implements are pivoted to respective points on the frame portion and are positioned to the rear of a supporting roller located behind the working members. The further implements can be material dispensing and each has a draw bar connected to a pivot point so that the further implements can each independently pivot about an upwardly extending axis. Delivery members on each further implement are raised automatically by a cable connection to an anchorage on the frame portion when the implement is raised by a lifting device of the prime mover for transport. The further implements are supported on ground wheels during operation and transport.

11 Claims, 6 Drawing Figures

SOIL CULTIVATING IMPLEMENTS

This invention relates to soil cultivating implements of the kind which comprise a plurality of soil working or cultivating members that are rotatable about upwardly extending axes, a rotatable supporting member that is disposed to the rear of the soil working or cultivating members with respect to the intended direction of operative travel of the implement, and means for pivotally connecting to the implement at least one further implement for delivering material into and/or onto the ground.

According to one aspect of the invention, there is provided a soil cultivating implement of the kind set forth, wherein the pivotal connection means comprises at least one coupling point that is located in advance to the rotatable supporting member with respect to said direction, the or each coupling point being constructed and arranged to define an upwardly extending axis about which the soil cultivating implement and any further implement that may be connected thereto at said point are relatively pivotable.

Figure 2:
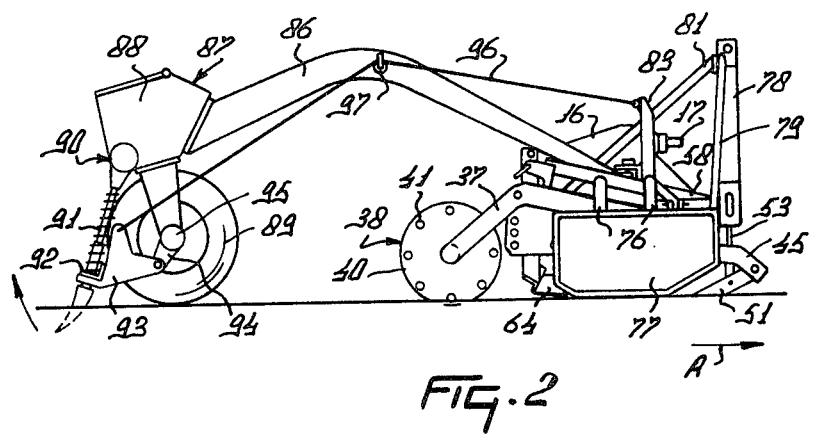
Figure 4:
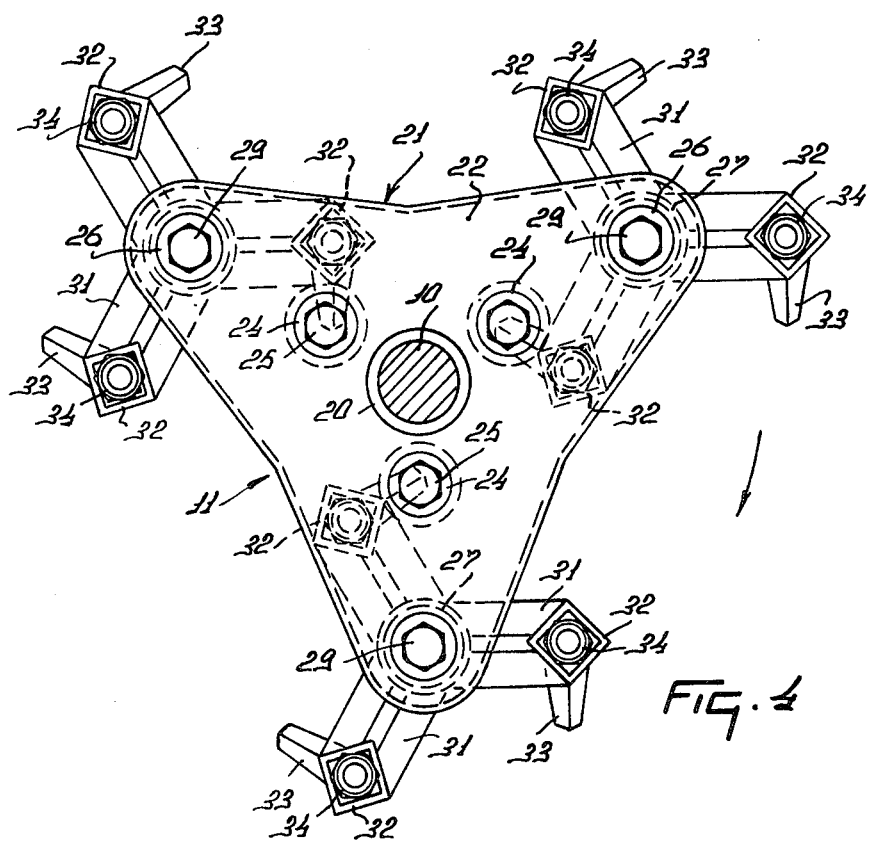
Figure 3:
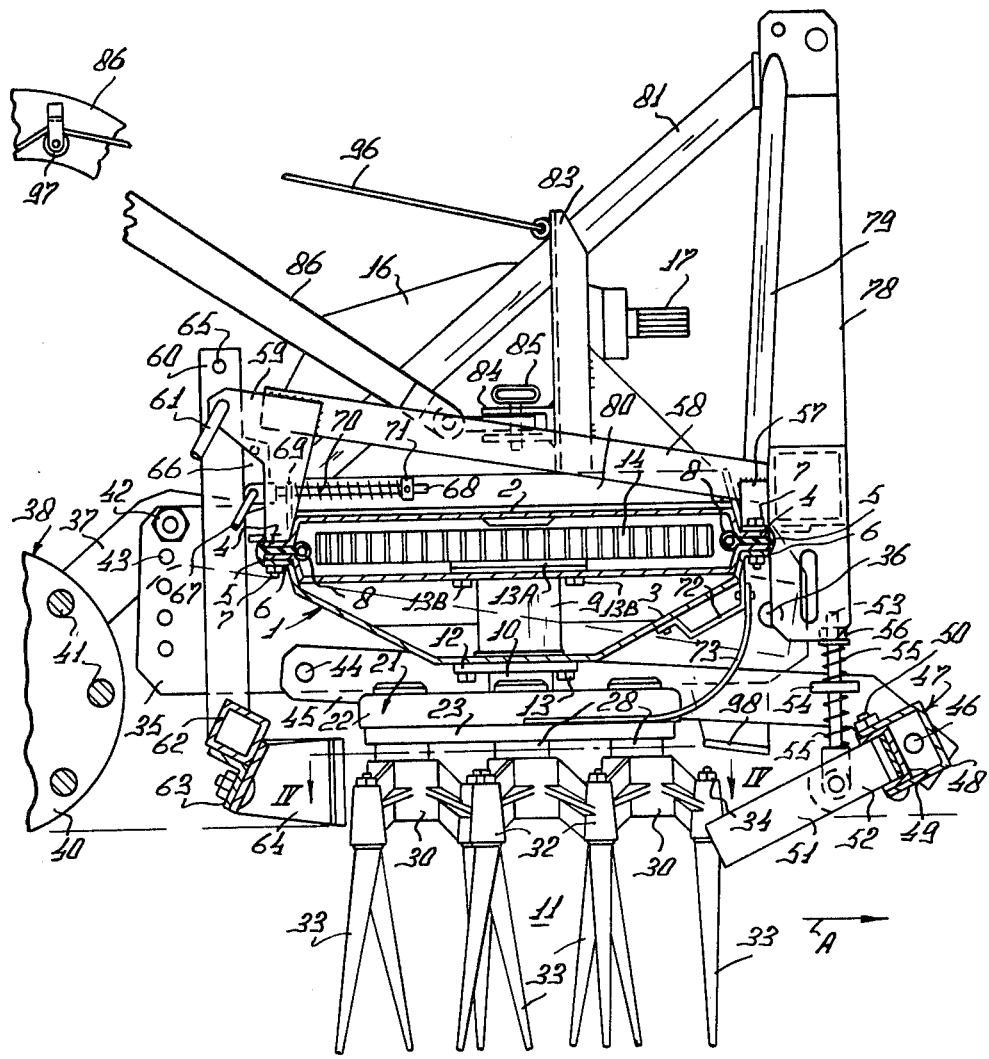
Figure 5:
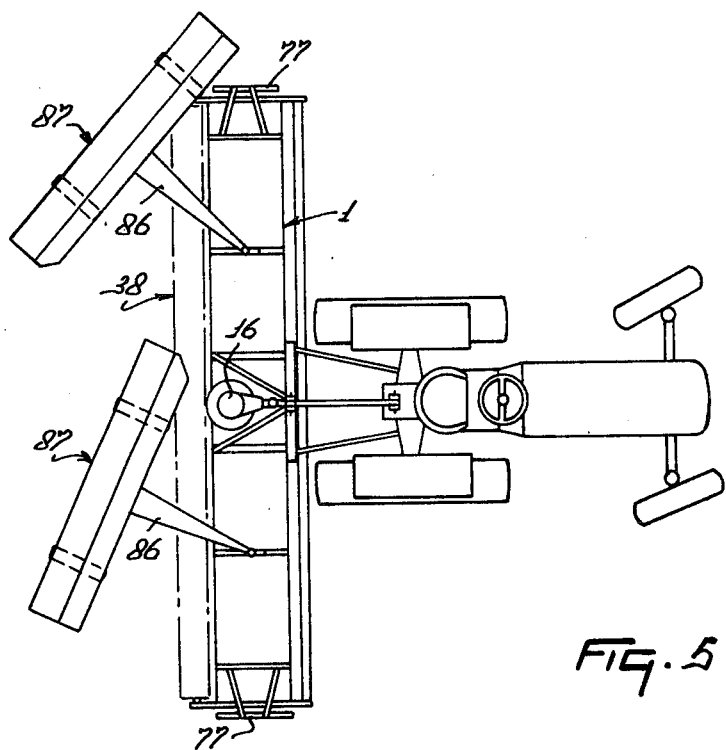
Figure 6:
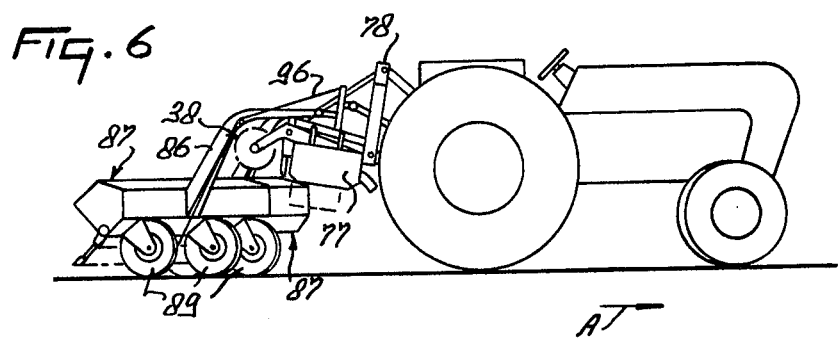

For a better understanding of the invention, and to show how the same may be carried into effect, reference will now be made, by way of example, to the accompanying drawings, in which:

FIG. 1 is a plan view of a soil cultivating implement in accordance with the invention in the form of a rotary harrow, two further implements being operatively connected thereto, FIG. 2 is a side elevation of the implement combination of FIG. 1 as seen in the direction indicated by an arrow II in that Figure, FIG. 3 is a section, to an enlarged scale, taken on the line III—III in FIG. 1, FIG. 4 is a section, to a further enlarged scale, taken on the line IV-IV in FIG. 3, FIG. 5 is a somewhat diagrammatic plan view, to a reduced scale, illustrating the implement combination of FIGS. 1 to 4 connected to the rear of an agricultural tractor and in course of negotiating a steep left-hand turn, and FIG. 6 is a side elevation to the same scale as FIG. 5 illustrating the implement combination connected to an agricultural tractor but with the combination arranged in a position that is suitable for inoperative transport thereof by the tractor.

Referring to the accompanying drawings, the soil cultivating implement that is the subject of at least one aspect of the invention is in the form of a rotary harrow having a hollow box-shaped frame portion 1 that is formed wholly or principally from sheet steel, said frame portion 1 extending substantially horizontally transverse, and usually substantially horizontally perpendicular, to the intended direction of straight operative travel of the implement that is indicated in FIGS. 1 to 3 and FIG. 6 of the drawings by an arrow A.

The hollow frame portion 1 comprises an upper transmission chamber 2 and an underlying trough 3, the longitudinal axes (perpendicular to the direction A) of the chamber 2 and trough 3 being substantially horizontally disposed in substantially parallel relationship with one another. As can be seen best in FIG. 3 of the drawings, the chamber 2 is of substantially, although not exactly oblong cross-section while the underlying trough 3 is of substantially inverted trapezoidal cross-section, the base of the trapezium thus being uppermost and being afforded by a steel sheet of the frame portion 1 that also affords the bottom of the chamber 2. In fact, the sheet steel plate that affords the bottom wall of the chamber 2 is in opposed relationship with a further symmetrically similar sheet steel plate that affords the top wall of the chamber 2. The top wall comprises a broad (in the direction A) substantially horizontal portion that is flanked at its front and rear edges by relatively narrow downwardly divergent portions which, in turn, are bent over to form substantially horizontal and substantially coplanar clamping rims 4. As already mentioned, the bottom wall of the chamber 2 is of symmetrically similar construction so that its leading and rearmost edges comprise substantially horizontally disposed and substantially coplanar clamping rims 5 that register with the overlying rims 4, a strip-shaped gasket 8 formed from a relatively hard synthetic resin or other synthetic plastics material being interposed between the clamping rims 4 and 5 for sealing purposes. It will be evident that, in order to maintain the seal, the rims 4 and 5 and the gasket 8 extend throughout the transverse length of the frame portion 1. The trough 3 is afforted wholly or principally by a single sheet steel wall which comprises a central substantially horizontally disposed base that is in parallel relationship with the major portions of the upper and lower walls of the chamber 2 and that is relatively narrow, as compared with those portions, in the direction A. The leading and rear edges of the base of the trough 3 are bent over to form portions that extend obliquely upwardly from those edges in steeply divergent relationship, the uppermost edges of the steeply divergent portions being bent over towards one another to form less steeply divergent portions whose upper edges, in turn, are bent over horizontally outwards to form substantially coplanar clamping rims 6 that engage beneath the clamping rims 5. It will be noted from FIG. 3 of the drawings that the narrow less steeply upwardly divergent portions of the wall of the trough 3 bear against the outer surfaces of the upwardly divergent portions of the sheet steel plate that affords the base of the chamber 2, the inclination to the horizontal thus being the same. Substantially vertically disposed bolts 7 clamp the rims 4 and 5 and the intervening gasket 8 to one another at substantially regular intervals along the lengths of the rims 4 and 5 but said bolts 7 do not also clamp the rims 6 to the rims 4 and 5. Clamping of the rims 6 is effected by further bolts (not illustrated) that are arranged in alternate relationship with the bolts 7, the purpose of this arrangement being to enable the trough 3 to be removed from underneath the chamber 2 without having to break the seal between the clamping rims 4 and 5 of the upper and lower walls of that chamber. It will be noted that, in fact, the rims 6 of the trough 3 stengtheningly support the rims 4 and 5 from beneath. Each of the strip-formation gaskets 8 comprises inner and outer enlarged rims. The inner rim is of circular cross-section and hollow formation and bears against the inner edges of the clamping rims 4 and 5 while the outer rim of each gasket 8 is solid and is formed with an outwardly directed convexly rounded-off surface. The inner surfaces of the outer rim of each gasket 8 bear coveringly against the free edges of the corresponding upper and lower clamping rims 4 and 5.

Both the bottom wall of the transmission chamber 2 and the base of the underlying trough 3 are formed with a row of circular holes whose centers are spaced apart from one another by regular distances that preferably have magnitudes of substantially 50 centimeters, said holes being disposed in upper and lower substantially vertically registering pairs. In the embodiment which is being described, there are ten pairs of the holes and each pair receives a corresponding bearing housing 9 for a substantially vertical, or at least upwardly extending, shaft 10. The lowermost ends of the ten rotary shafts 10 are provided with corresponding soil working or cultivating members 11 that will be further described below. Each bearing housing 9 has a flange 12 at its lowermost end and, when the housing 9 is assembled into its operative position, the upper surface of the base of the trough 3, the flange 12 being releasably secured to said base by a plurality of bolts 13. The upper end of each bearing housing 9 projects upwardly through the corresponding circular hole in the bottom wall of the transmission chamber 2, said end being of reduced diameter as compared with the remainder of the housing for co-operation with a closely circumscribing ring 13A. The ring 13A has a shoulder or flange that is not visible in the drawings but which is entered into the circular hole concerned so as to surround the upper end of the bearing housing 9 between its outer surface and the inner edge of the hole. The ring 13A is secured to the lower wall of the chamber 2 by a plurality of bolts 13B a sealing ring (not visible) being interposed between the ring 13A and said bottom wall and a second sealing ring (also not visible) being lodged in a circumscribing groove formed in the outer surface of the reduced diameter end portion of the bearing housing 9 for co-operation with the closely surrounding ring 13A. This arrangement prevents liquid lubricant inside the transmission chamber 2 from leaking downwardly around the bearing housings 9 into the open interior of the trough 3.

An upper end region of each shaft 10 is provided, inside the transmission chamber 2, with a straight- or spur-toothed pinion 14 having an effective diameter of substantially 50 centimeters and it will be apparent from FIG. 1 of the drawings that the ten pinions 14 are arranged in a single row with the teeth of each pinion in mesh with those of its neighbour, or both of its neighbours, in said row. Thus, during operation, each pinion 14 and the parts that are connected thereto will revolve in a direction that is opposite to that of the immediately neighbouring pinion 14 or both of the immediately neighbouring pinions 14, the intended directions of operative rotation of the pinions 14 being indicated by small arrows in FIG. 1 of the drawings. One of the two pinions 14 that are the center pair of pinions of the single row thereof has its teeth in driven mesh with a further pinions carried by a substantially vertical shaft 15 that is located behind the shaft 10 with respect to the direction A, said further pinion thus being located towards the rear of the frame portion 1 with respect to said direction A. The shaft 15 upon which said further pinion is mounted is rotatably journalled in aligned substantially vertical bearings carried by the top and bottom walls of the chamber 2 and extends into a gear box 16 that is mounted on top of the chamber 2. The shaft 15 carries, inside the gear box 16, a bevel pinion whose teeth are in driven mesh with those of a further bevel pinion carried by a rotary input shaft 17 of the gear box 16 which is substantially horizontally parallel to the direction A, the leading end of said shaft 17 projecting forwardly from the front of the gear box 16 where it is splined (FIG. 3) to enable it to be placed in driven connection with the power take-off shaft of an agricultural tractor or other vehicle that moves and operates the implement during its use, the connection between the power take-off shaft and the rotary input shaft 17 being by way of an intermediate telescopic transmission shaft (not shown in FIG. 3) that is of a construction which is known per se having universal joints as its opposite ends.

The lowermost end of each shaft 10 that projects downwardly from beneath the base of the trough 3 is splined and receives a matchingly splined hub 20 at the center of a support 21 of the soil working or cultivating member 11 concerned. The hubs 20 are prevented from becoming axially detached from the splined ends of the shafts 10 by forming those shafts with short screwthreaded extremities upon which retaining nuts and cooperating washers (not visible) are mounted. Each support 21 comprises an upper plate 22 that is of approximately, but not strictly, equilateral triangular configuration (see FIG. 4) and a lower plate 23 that is of the same shape but slightly smaller size. The upper plate 22 has a rim that is bent over perpendicularly downwards and the lower plate 23 has a rim that is bent over perpendicularly upwards so as to fit just inside the rim of the plate 22 (see FIG. 3). The two plates 22 and 23 of each support 21 are provided at 120° intervals around the axis of the corresponding shaft 10 with three depressions 24 that register with cavities at the three corners of a flange 20A on the corresponding hub 20, said flange 20A being of equilateral triangular shape apart from the formation of the three cavities at its corners. The flange 20A is disposed between the two upper and lower plates 22 and 23, those plated being clamped to one another by three bolts 25 which are entered in the registering depressions 24 in the upper and lower plates. Once the bolts 25 are tightened, the support 21 is effectively secured to the flange 20A and thus to the hub 20. It can be seen from FIG. 4 of the drawings that the upper and lower approximately equilateral triangular plates 22 and 23 of each support 21 actually have rounded corners and sides that are of shallow inverse shape. The upper plate 22 is formed close to its three corners with three depressions 26 around which corresponding housings 27 are arranged beneath the substantially planar body of the plate 22 and above the substantially planar body of the corresponding plate 23. In fact, the lowermost end of each housing 27 registers with a hole in the plate 23 which hole receives, from beneath, a corresponding substantially vertical stub shaft 28 (FIG. 3). Each stub shaft 28 closely fits the wall of the corresponding housing 27 and extends upwardly into the registering depression 26 of the upper plate 22. The stub shaft 28 has a shoulder or flange at its lowermost end that bears against the lower surface of the lower plate 23, said stub shaft 28 being retained in its operative position by a bolt 29 that is entered downwardly through a hole in the bottom of the depression 26 in the upper plate 22.

Each stub shaft 28 projects downwardly from beneath the corresponding support 21 and there has the hub 30 of a corresponding tool support 31 mounted upon it in a freely rotatable manner. Each tool support 31 comprises three arms that project outwardly away from its hub 30 at 120° intervals around the longitudinal axis of the associated stub shaft 28. However, reference to FIG. 3 of the drawings will show that the three arms of each support 31 are not strictly radially disposed and actually extend obliquely downwardly from the hub 30 concerned towards their outermost ends. The outermost ends of the three arms of each support 30 carry corresponding sleeve-like tine holders 32 and it will be seen from the drawings that the hubs 30, the holders 32 and their interconnecting arms are provided with upper and lower strengthening ribs. Each holder 32 firmly but releasably receives a fastening portion of a corresponding rigid soil working tine 33. Each holder 32 is of an upwardly tapering configuration and has a polygonal cross-section which it is preferred should be, as illustrated (see FIG. 4), a square one. With the illustrated construction, the fastening portion of each tine 33 is also of upwardly tapering configuration and square cross-section and this enables it to occupy any chosen one of four different angular positions in the co-operating holder 32, the upper end of each tine fastening position have a short screw-threaded part upon which a retaining nut 34 is releasably positioned to maintain the fastening portion of the associated tine 33 in the co-operating holder 32.

In addition to its fastening portion, each tine 33 has an integral soil working portion that extends downwardly away from its junction with the fastening portion. The soil working portion is also of a polygonal cross-section which it is preferred should be substantially square and it is of a substantially rectilinear configuration that tapers gently from top to bottom. The longitudinal axes of the fastening portion and soil working portion of each tine are inclined to one another, at the integral junction between those portions, by an angle of not less than substantially 15° and it will be realized that it is this construction that is effective in bringing about a change in the configuration of the freely rotatable cultivating tools of which the tines 33 form parts when the fastening portions of those tines are moved to different angular settings in the square or other internal polygonal cross-section holders 32. The tines 33 are shown in FIGS. 3 and 4 of the drawings as occupying positions in which their soil working portions trail rearwardly from top to bottom with respect to the directions in which the cultivating tools of which they form parts are compelled to revolve around the corresponding stub shafts 28 when the implement is in operation as the result of the contact of said soil working portions of the tines with the ground. With this illustrated arrangement, each cultivating tool will revolve as a result of the contact of its tines 33 with the ground, during operation, in a direction that is opposite to the direction of rotation of the mechanically driven soil working or cultivating member 11 of which said tool forms a part. When the tines 33 of the cultivating tools are arranged in the settings illustrated in the drawings, each such tool has an effective working diameter of substantially 20 centimeters.

The opposite ends of the hollow frame portion 1 are closed by substantially vertical side plates 35 that are in parallel relationship with one another and substantially parallel relationship with the direction A, said side plates 35 projecting both forwardly in front of, and rearwardly behind, the chamber 2 and trough 3 relative to said direction A. Two substantially horizontally aligned stub shafts 36 are carried by the forwardly projecting portions of the two side plates 35 and two arms 37 are turnable upwardly and downwardly about the axis defined by the stub shafts 36 alongside the relatively remote surfaces of the two plates 35. It will be seen from FIGS. 2 and 3 of the drawings that each arm 37 extends rearwardly from the corresponding stub shaft 36 alongside the plate 35 concerned and is of substantially straight configuration between its pivotal mounting and a location that is close to the rearmost edge of the neighbouring side plate 35. However, from said location, each arm 37 is bent over downwardly to form an obliquely downwardly and rearwardly inclined substantially straight portion. A rotatable implement-supporting and soil-crumbling member in the form of an open ground roller 38 is journalled between the rearmost and lowermost ends of the two arms 37 so as to be capable of revolving about a substantially horizontal axis coinciding with the longitudinal axis of a central tubular support 39 of the roller. A plurality, such as eleven, of substantially circular support plates 40 are secured to the central tubular support 39 at regular intervals therealong in such positions that two of the plates 40 are at the opposite ends of the tubular support 39. Each support plate 40 is formed close to its periphery with a plurality, such as eight, of holes that are regularly spaced apart from one another around the axis of the central tubular support 39. Elongate elements 41 are entered through the substantially peripheral holes in the plates 40 so as to extend lengthwise along the roller 38 but helically around its axis of rotation. Small transverse pins or the like (not shown) are provided to prevent unwanted axial displacement of the elements 41, each element 41 preferably being of solid rod-shaped formation, as illustrated, but a tubular formation being usable if preferred.

The rear of each side plate 35 with respect to the direction A is formed with a curved row of holes 43 that are equidistantly spaced from the axis defined by the stub shaft 36. Each arm 37 is formed at substantially the junction between its two rectilinear portions with a hole that can register with any chosen one of the holes 43 in about its own substantially horizontally extending longitudinal axis. The support 47 comprises a beam 48 of channel-shaped cross-section between the limbs of which a second beam 49 of channel-shaped cross-section is arranged, the second beam 49 having shorter limbs than the beam 48 and being arranged so that, as seen in cross-section (FIG. 3), the edges of the limbs of the second beam 49 lie alongside those of the limbs of the first beam 48 in mutually registering relationship. The four limbs of the two beams 48 and 49 are interconnected at substantially regular intervals along the support by pairs of bolts 50. In addition to interconnecting the limbs of the beams 48 and 49, each pair of bolts 50 also secures a corresponding pair of elongated elements 51 between the limbs of the second beam 49. The elongated elements 51 are in the form of rectangularly shaped spring steel strips and are made in integral pairs with the junctions between the two elements 51 of each pair being the parts thereof that lie between the limbs of the second beam 49 where they are retained by the corresponding pairs of bolts 50. It can be seen from the drawings that the elongated elements 51 are not all of the same length and the reason for this will be discussed below.

Each element 51 has a substantially rectangular free end and it will be seen from the drawings that the elements 51 are inclined downwardly and rearwardly with respect to the direction A from the support 47 in such a way that their free ends are located close (as seen in plan view — FIG. 1) to the circular paths that are traced by the tines 33 of the cultivating tools of the successive soil working or cultivating members 11 during the positive rotation of those members about the axes of the shafts 10. Thus, those elements 51 that are disposed substantially directly in register with the shafts 10 in the direction A are the shortest while those that are located in register with positions midway between the pairs of shafts 10 are the longest, the other elements 51 being of progressively differing intermediate lengths. A careful study of FIG. 1 of the drawings will also show that those elements 51 of each pair that are longest and substantially in register in the direction A with locations midway between two of the shafts 10 are closer to one another than are the two elements 51 of each pair that are substantially in register in the direction A with one of the shafts 10, the latter elements being shorter. This arrangement enables the longest elements 51 to extend rearwardly from the support 47 for a greater distance than would be possible if the two elements 51 of each longer pair were spaced apart from one another by the same distance as the two elements 51 of each shorter pair.

The opposite ends of the support 47 are provided, adjacent the stub shafts 46, with rearwardly and downwardly projecting lugs 52 to which the lowermost ends of corresponding upright rods 53 are turnably connected by horizontal pivot pins. The rods 53 extend upwardly from their pivotal connections to the lugs 52 through holes in brackets 54 that are secured to the arms 45. The uppermost end of each rod 53 is screwthreaded and carries a corresponding axially displaceable nut 56 and co-operating washer. Two helical compression springs 55 are wound around each rod 53, one spring 55 and bearing between the upper surface of the corresponding bracket 54 and the lower surface of the washer that co-operates with the corresponding nut 56 and the other spring 55 bearing between the lower surface of the corresponding bracket 54 and an enlargement at the lower end of the rod which forms part of the pivotal connection of that rod to the corresponding lug 52 by way of the corresponding pivot pin. With this arrangement, the support 47 and the elongated elements 51 will tend to occupy a substantially fixed angular position about the axis defined by the stub shafts 46 relative to the arms 45 but upward or downward pivotal movements about said axis are readily possible, away from the substantially fixed position, against the action of either the upper springs 55 or the lower springs 55. The substantially fixed angular position can be adjusted, as may be required, by moving the nuts 56 upwardly or downwardly along the screwthreaded upper ends of the rods 53.

The leading upper clamping rim 4 of the hollow frame portion 1 carries two pairs of upright lugs 57 at locations which are substantially 50 centimeters from its opposite ends. Each pair of lugs 57 has the leading end of a corresponding arm 58 rigidly welded or otherwise secured between them and it can be seen in FIG. 3 of the drawings that each arm 58 extends rectilinearly rearwards with respect to the direction A from the corresponding pair of lugs 57 in an upwardly inclined direction that makes an angle of only a few degrees with the horizontal. The rearmost and uppermost end of each arm 58 has support plates 59 welded to its opposite sides, said support plates 59 being so shaped as to have parts which project downwardly beneath the arm 58 concerned and parts which project rearwardly beyond the rearmost end of that arm. The shape of each support plate 59 can be seen best in FIGS. 2 and 3 of the drawings. The rearwardly extending parts of each pair of support plates 59 engage the opposite sides of a corresponding upright beam 60, the lowermost end of the two upright beams 60 being rigidly interconnected by a substantially horizontally disposed levelling beam 62 that actually extends beyond both of the upright beams 60 to cover substantially the whole of the working width of the implement. The upper end of each upright beam 60 is formed with two transverse holes 65 that are vertically spaced apart from one another and the rearwardly extending parts of each pair of support plates 59 that engage opposite sides of the respective beams 60 are formed with horizontally aligned holes that can register with either hole 65. Horizontal locking pins 61 are provided for entry through the holes in the plates 59 and the chosen intervening holes 65 so that, depending upon the holes 55 that are selected, the levelling beam 62 will be maintained at a corresponding level relative to the hollow frame portion 1.

The levelling beam 62 that extends substantially horizontally perpendicular to the direction A throughout substantially the whole of the working width of the implement is in parallel, or substantially parallel, relationship with a plane containing the axes of rotation of all ten of the shafts 10. The beam 62 is of hollow formation and has a polygonal cross-section that it is preferred should be square, as illustrated (FIG. 3). With this preferred configuration of the beam 62, one diagonal of the cross-section thereof is substantially vertically disposed whilst the other perpendicular diagonal is substantially horizontally disposed. A bar 63 of L-shaped cross-section has one limb welded or otherwise rigidly secured to one of the surfaces of the beam 62 that faces downwardly towards the ground surface and rearwardly towards the roller 38 with respect to the direction A. The arrangement is such that the other limb of the bar 63 has a surface which is substantially coplanar with a surface of the beam 62 which faces downwardly towards the ground but forwardly towards the soil working or cultivating members 11 with respect to the direction A. The limb of the bar 63 that has just been discussed has bolted to its leading surface, at five locations which are regularly spaced apart from one another along the transverse length of the beam 62 and bar 63, soil guides in the form of pairs of resilient strips 64 which are conveniently, but not essentially, formed from spring steel of other resilient sheet steel. The two strips 64 of each pair converge forwardly with respect to the direction A and it will be seen from FIG. 1 of the drawings that each pair of strips 64 is located in substantial register, in the direction A, with the region of working overlap between a corresponding pair of co-operating soil working or cultivating members 11. "Co-operating" means that, in the regions of overlap between them during operation of the implement, the parts of the two members 11 that pass through said region are both moving rearwardly with respect to the direction A towards the back of the implement. The two strips 64 of each pair are both of substantially cylindrically curved configuration with the center of curvature of each strip substantially coinciding with the axis of rotation of a corresponding one of the co-operating pair of members 11 that lie substantially directly in front of the pair of strips 64 in question with respect to the direction A. The strips 64 are quite close to the paths that are traced by the tines 33 when the members 11 are in operative rotation. At the location at which each pair of forwardly convergent strips 64 meet, one of them is bent over rearwardly in front of the other to produce the overlapping configuration which is most clearly visible in FIG. 3 of the drawings. It is also noted that the strips 64 do not have parallel upper and lower edges but are shaped in such a way that those edges diverge forwardly by a few degrees from the rear ends of the strips towards their leading ends. Once again, this configuration can be seen in FIG. 3 of the drawings.

Each of the two upright beams 60 is provided, substantially midway between its upper and lower ends and at the front thereof with respect to the direction A, with two forwardly projecting lugs 66, each pair of lugs being formed with two pairs of horizontally registering holes by which a correspondng horizontal locking pin 67 can connect a fork at the rearmost end of a corresponding rod 68 to said lugs 66 at either one of two different levels. Each rod 68 extends substantially horizontally forwards from its forked rearmost end and is entered through a hole in a vertical limb of a corresponding bracket 69 mounted at the rear of the frame portion 1. Towards its leading end, each rod 68 is surrounded by an axially slidable stop ring 71 that can be fixed in any chosen setting axially along the rod 68 by a set bolt or the like (not shown in detail). A helical compression spring 70 is wound around each rod 68 so as to bear between the upright limb of the corresponding stop ring 71. The two upright beams 60 are turnable relative to the support plates 59 about a horizontal axis that is defined by the aligned locking pins 61 and it will be seen from FIG. 3 of the drawings that the springs 70 tend to turn said beams 60 and the parts 62, 63 and 64 which they carry in an anticlockwise direction about said axis as seen in that Figure. The springs 70 normally maintain the parts 60, 62, 63 and 64 in abutting engagement with stops that are not shown in the drawings but, in the event of a loose stone or the like becoming jammed during operation of the implement, the levelling beam 62, the bar 63 and the strips 64 can yield rearwardly with respect to the direction A against the action of the springs 70 to allow the momentarily jammed obstacle to be released. Once this happens, the springs 70 immediately return the deflected parts to substantially the position thereof that is shown in the drawings.

Five brackets 72 (FIG. 3) are fastened to the trough 3 of the hollow frame portion 1 close to the front of that frame portion and at regularly spaced apart intervals which are in register, in the direction A, with the regions of overlap between corresponding co-operating (as discussed above) pairs of the soil working or cultivating members 11. Each bracket 72 has a corresponding soil crumbling member 73 of spring steel or other sheet steel construction fastened to it. As seen in plan view (FIG. 1), each soil crumbling member 73 is of approximately isosceles triangular configuration, the base of the triangle being foremost with respect to the direction A and being the part that is secured to the corresponding bracket 72. However, as seen in FIG. 3 of the drawings, each soil crumbling member 73 is curved downwardly and rearwardly through substantially 90° from the upper edge thereof that is fastened to the corresponding bracket 72, the curve terminating in a flat portion that is substantially horizontally disposed with the rearmost end of said portion (the apex of the corresponding substantially isosceles triangle) coinciding with, or very close to, a substantially vertical plane which contains the axes of rotation of all ten of the shafts 10. The substantially horizontal portion of each soil crumbling member 73 that extends rearwardly from the lowermost end of the corresponding curve is located at the level of, and between, the supports 21 of the corresponding pair of co-operating coil working or cultivating members 11 and thus at a horizontal level which is only just above that of the upper ends of the nine tines 33 of each member 11.

Two support beams 74 that extend substantially parallel to the direction A interconnect brackets carried by the front and rear of the hollow frame portion 1 at locations which are spaced by distances of substantially 25 centimeters inwardly from the side plates 35 at the opposite ends of said frame portion 1. Each support beam 74 has the ends of two arms 76 pivotably connected to it by a pair of pins 75 which are spaced apart from one another in the direction A but which define a substantially horizontal axis that is substantially parallel to that direction. Each pair of arms 76 converges outwardly away from the corresponding pivot pin 75 to locations beyond the upper edge of the corresponding side plate 35. The arms 76 are then bent over downwardly to carry a corresponding shield plate 77 that will be substantially vertically disposed during operation of the implement and whose lower edge is shaped to slide forwardly over the ground surface in the direction A, (see FIG. 2). It will be realized that the shield plates 77 are turnable upwardly and downwardly about the axes defined by the corresponding pairs of pivot pins 75 to match undulations in the surface of the ground that may be met with during operation progress in the direction A. The shield plates 77 co-operate with the immediately neighbouring soil working or cultivating members 11 in minimising ridiging of the soil at the margins of the board strip thereof that is worked by the implement and greatly reduce the possibility of stones and other potentially dangerous items being flung laterally of the path of travel of the implement by its rapidly moving tines 33.

The front of the hollow frame portion 1 with respect to the direction A is provided, midway between the planes that contain the two side plates 35, with a coupling member or trestle 78 that is of generally triangular configuration when viewed in front or rear elevation and that is arranged for co-operation with the three-point lifting device or hitch at the rear of an agricultural tractor or other operating vehicle in the manner that can be seen in outline in FIGS. 5 and 6 of the drawings. Two downwardly divergent tie beams 79 interconnect substantially the apex of the coupling member or trestle 78 and plates at the leading ends of strengthening beams 80 which extend substantially parallel to the direction A in interconnecting relationship between the front and rear of the hollow frame portion 1. Further tie beams 81 diverge obliquely downwardly and rearwardly with respect to the direction A from substantially the apex of the coupling member or trestle 78 and have their rearmost ends rigidly fastened to the tops of still further strengthening beams 82 which are similarly disposed to the strengthening beams 80 except that they are much closer to the center of the implement. As can be seen best in FIG. 1 of the drawings, the further tie beams 81 are secured to the tops of the still further strengthening beams 82 close to the rearmost ends of those beams 82 with respect to the direction A.

Each of the two strengthening beams 80 is provided on top and substantially midway along its length in the direction A with an upright support 83 (FIG. 3) of channel-shaped cross-section. The rear of each upright support 83 with respect to the direction A carries a corresponding forked bracket whose limbs are horizontally disposed in vertically spaced apart relationship so as to project rearwardly with respect to the direction A from the upright support 83 concerned. Vertically aligned holes in the limbs of each bracket 84 are arranged for the reception of a substantially vertical or at least upwardly extending, hitch pin 85 which, when installed, can be entered through a hole in a coupling plate pivotally mounted at the leading end of an arched draw bar 86 of a further implement that is to be used with the soil cultivating implement, said further implement being in the form of a seed drill that is generally indicated by the reference 87. It will be apparent from FIGS. 1 and 3 of the drawings that the soil cultivating implement can be used in combination with two substantially identical seed drills 87 and that the coupling plates at the leading ends of their arched draw bars 86 are sandwiched between the upper and lower limbs of the corresponding forked brackets 84 so as to be turnable relative thereto about the substantially vertical axes that are defined by the associated hitch pins 85. The lowermost limb of each forked bracket 84 is extended obliquely downwardly and rearwardly and is welded or otherwise rigidly secured to the top of the neighbouring strengthening beam 80.

Each of the seed drills 87 comprises a seed hopper 88 which is of elongate configuration in a substantially horizontal direction that is substantially perpendicular to the direction A, the hopper 88 being supported from beneath by a pair of spaced ground wheels 89. FIGS. 1 and 5 of the drawings reveal that the two seed drills 87 are arranged in side-by-side relationship in such a way that they will co-operate to sow a single substantial uninterrupted broad strip of land with seeds even when the agricultural tractor or other operating vehicle, the soil cultivating implement and the two seed drills are negotiating a quite steep bend. It will be noted that the fronts of the two seed hoppers 88 with respect to the direction A are bevelled in opposite directions at the closely adjacent ends thereof. Each seed drill 87 includes a row of telescopic seed delivery tubes 90 that are resiliently urged into extended positions in such a way that lower portions 91 of said tubes, which portions carry corresponding coulters, are upwardly displaceable with a common support 92 thereof against the action of the springs which provide the resilient loading. Each common support 92 is provided substantially centrally across its width (perpendicular to the direction A) with a rocker 93 that is turnable upwardly and downwardly about a horizontal pivot relative to two lugs 94 that are fastened to a non-rotary axle shaft 95 of the corresponding pair of spaced ground wheels 89. Each rocker 93 includes an upwardly projecting portion to the top of which is secured one end of a corresponding control member in the form of a length or cable 96 or the like. The cable 96 or the like extends upwardly from the rocker 93 and over a pulley 97 that is rotatably mounted at substantially the apex of the corresponding arched draw bar 86. The cable 96 or the like then extends forwardly from the pulley 97 to an anchorage at the top of the corresponding upright support 83 on the soil cultivating implement. It can be seen in the plan view of FIG. 1 of the drawings that the two seed drills 87 together cover a strip of land which has the same width as that covered by the row of ten soil working or cultivating members 11, the two strips being exactly, or substantially exactly, coincident and each of them having a width of substantially 5 meters in the case of the particular example that is illustrated in the accompanying drawings. The moving parts of the two seed drills 87 are conveniently driven from their ground wheels 89 in a manner which it is not necessary to describe nor to illustrate for the purposes of the present invention and which may, in any case, be a manner which is known per se.

In the use of the soil cultivating implement that has been described when employed in combination with the two seed drills 87, its coupling member or trestle 78 is connected to the three-point lifting device or hitch at the rear of an agricultural tractor or other operating vehicle in a manner which is generally known per se and which can be seen, in outline, in FIGS. 5 and 6 of the drawings. The aforementioned intermediate telescopic transmission shaft of known construction that has universal joints at its opposite ends is used to place the rotary input shaft 17 of the gear box 16 in driven connection with the power take-off shaft of the agricultural tractor or other operating vehicle, the position of this intermediate telescopic transmission shaft being visible in FIG. 6 of the drawings. One of the adjustments that will be made before work commences is to set the maximum depth to which the tines 33 can penetrate into the soil by bringing the level of the axis of rotation of the roller 38 to an appropriate position relative to the level of the hollow frame portion 1. The chosen level is maintained by entering the bolts 42 through whichever of the holes 43 correspond to the required level. Clearly, the nature and condition of the soil that is to be worked are factors in choosing an appropriate maxmum depth of penetration for the tines 33 but the nature of the seeds that are to be sown by the drills 87 and of the plants that will germinate therefrom should also receive consideration. As the implement combination moves operatively over a field in the direction A, the ten successively neighbouring soil working or cultivating members 11 will revolve in the directions that are indicated by small arrows in FIG. 1 and by a larger arrow, in respect of only one of them, in FIG. 4. Each member 11 is mechanically rotated about the axis of the corresponding shaft 10 and comprises three tined cultivating tools each of which is freely rotatable, as the result of the contact of its three tines 33 with the soil, about the axis of the corresponding stub shaft 28. With the tines 33 disposed as illustrated in the drawings, each cultivating tool will revolve in a more or less regular manner in a direction opposite to that in which the soil working or cultivating member of which it forms a part is positively rotated. If one or more of the tines 33 should meet a large stone or other firmly embedded obstacle, the rotation of the corresponding tool may be temporarily halted, or even be momentarily reversed in direction, until the tine or tines 33 concerned has or have circumnavigated the stone or other obstacle. Each soil working or cultivating member 11 will work an individual strip of land having a width of substantially 50 centimeters, the neighbouring strips of land overlapping one another to produce a single broad strip of worked soil having a width of substantially 5 meters. It should be borne in mind, however, that the tines 33 can be repositioned in their holders 32 and that this can alter the effective working width of each soil working or cultivating member 11. During the rotation of the members 11, the soil crumbling members 73 that are located between each co-operating pair of the members 11 function in unison with the tines 33 of the ground-driven cultivating tools in thoroughly crumbling at least an uppermost layer of the top soil. Since each soil crumbling member 73 is made from spring steel or other sheet steel and tapers rearwardly with respect to the direction A, the members 73 will tend to conduct stones and other hard obstacles rearwardly to positions where they can fall back into the soil without damaging the implement. Such stones and like obstacles will normally fall back onto the ground surface at positions to the rear of the regions of overlap between the successive pairs of co-operating soil working or cultivating members 11 and thus in between the tined cultivating tools of those members.

In order to avoid, or at least very significantly to reduce, unwanted lateral displacement of the soil at the fronts of the members 11 with respect to the direction A, the spring steel or other resilient strip-shaped elongated elements 51 penetrate downwardly into the soil surface by their lowermost edges and all, or most, of the soil that is displaced forwardly by the rotating tools 11 is trapped between the successive elements 51 and is therefore not displaced laterally to any significant extent, if at all. The trapped soil is gradually released for further working by the members 11 as progress in the direction A continues. In addition to this advantageous function of the elements 51, they have a pre-cultivating effect upon the soil because their lower edges form slits therein that extend parallel, or generally parallel, to the direction A, their resilience tending to initiate the crumbling of the soil that is principally effected by the tines 33 and that is completed, in certain cases, by the roller 38 whose elements 41 will crush any large lumps of soil that may exceptionally be left lying on the surface even after treatment by the foregoing members 11. The elongate elements 51 are urged resiliently downwardly into contact with the soil by the springs 55 and their pressure can be increased or decreased by adjustment of the nuts 56 axially along the rods 53. The resilient mounting allows the elements 51 to yield upwardly in the event of meeting a large stone or other obstacle so that they can ride over the top of that stone or other obstacle without being damaged thereby. The arms 45 are freely turnable upwardly and downwardly about the axis defined by the stub shafts 44 during the operation of the implement but stops 98 (FIG. 3) prevent them from turning too far downwardly both during operation and when the implement is raised into a position that is suitable for the inoperative transport thereof.

When the soil cultivating implement is disposed in its working position, the levelling beam 62 that is located between the soil working or cultivating members 11 and the roller 38 with respect to the direction A occupies the position that is illustrated in FIGS. 2 and 3 of the drawings. There is a tendency for soil displaced by the co-operating pairs of members 11 to be delivered rearwardly with respect to the direction A predominantly at locations in register with the regions of overlap between the pairs of co-operating members 11. Thus, there is some tendency for ridges of soil that extend parallel to the direction A to be formed along these lines of predominant delivery but this tendency is overcome, or very greatly reduced, by the provision of the resilient strips 64 since those strips are disposed in line with the regions of overlap between the co-operating pairs of members 11 so that they divert the soil of any ridges that are formed laterally in two different and substantially opposite directions with the result that the crumbled soil is left more or less uniformly distributed throughout the working width of the implement. The levelling beam 62 itself and the bar 63 that is secured thereto substantially complete the levelling action and the immediately following roller 38 finally spreads and eliminates the residues of any ridges that may have been formed by the co-operating pairs of members 11. In addition to its supporting function, the roller 38 gently compresses the flat strip of crumbled soil that has been formed by the foregoing members 11 and the beam 62 and the parts which it carries so that the soil cultivating implement brings the soil to substantially an optimum condition for the sowing of seed by the two seed drills 87. The draw bar 86 of each seed drill 87 is universally pivotable relative to the frame portion 1 of the soil cultivating implement by virtue of the coupling plate that is pivotable about a substantially horizontal axis relative to the draw bar 86 at the leading end thereof, said coupling plate being sandwiched between the limbs of the corresponding forked bracket 84 so as to be turnable about the substantially vertical longitudinal axis of the corresponding hitch pin 85. It is noted particularly that the coupling point between each draw bar 86 and the soil cultivating implement is located forwardly, with respect to the direction A, of the rotatable supporting member and soil crumbling member of the cultivating implement that is afforded by its ground roller 38. In fact, it is preferred that, as illustrated, the substantially vertical or at least upwardly extending pivotal axis of each coupling point that is embodied in the corresponding hitch pin 85 should be contained in, or be very close to, a substantially vertical plane which contains the axes of rotation of all ten of the shafts 10 and thus of all ten of the soil working or cultivating members 11. The two seed drills 87 sow seed in two adjoining strips of land that together have the same width as, and exactly, or substantially exactly, coincide with, the single broad strip of land that is worked by the soil cultivating implement. The seed drills 87 can match undulations in the surface of the ground that is being cultivated and sown, independently of the cultivating implement, because the coupling points at the leading ends of their draw bars 86 effectively incorporate universal joints so that substantially any combination of lateral and vertical relative movement is possible. FIG. 5 of the drawings diagrammatically illustrates what occurs when a steep left-hand bend is negotiated by the implement combination and the agricultural tractor or other vehicle which tows the combination. Even during negotiation of the bend, the two strips of land that are sown with seed by the two drills 87 remain in substantially adjoining relationship and in substantial register with the strip of land that is worked by the foregoing soil cultivating implement so that there is no necessity to discontinue the work that is being carried out by the implement combination during the negotiation of a steep bend. The bevelled neighbouring ends of the fronts of the seed hoppers 88 avoid fouling of the soil cultivating implement by either of the drills 87 during either a sharp left-hand turn or a sharp right-hand turn and the arched configuration of the draw bars 86 prevents either of them from fouling any part of the soil cultivating implement under the same circumstances.

When the implement combination is to be transported from one place to another by the agricultural tractor or other operating vehicle without performing any cultivating or seed sowing operation, the three-point lifting device or hitch at the rear of the tractor or other vehicle is raised and this lifts the soil cultivating implement in a position in which it is well clear of the ground as shown in FIG. 6 of the drawings, it being noted that the stops 98 (FIG. 3) prevent the arms 45 and the parts which they carry from dropping downwardly under these circumstances. The two seed drills 87 are not, of course, raised with the soil cultivating implement since their draw bars 86 turn downwardly about the pivotal connections to the coupling plates at their leading ends and their ground wheels 89 remain in contact with the ground. However, the flexible cables 96 or the like are of inextensible construction and, when raising of the three-point lifting device or hitch of the tractor or other operating vehicle takes place, the distance between the tops of the upright supports 83 and the pulleys 97 is increased. The cables 96 are thus pulled forwardly over the pulleys 97 with respect to the direction A so that the rockers 93 are turned upwardly about their pivotal connections to the lugs 94 in the direction that is indicated by an arrow at the left-hand side of FIG. 2 of the drawings. The lower portions 91 of the seed delivery tubes 90 are thus telescoped into the upper portions thereof against the action of the surrounding springs and the coulters are lifted to positions in which their lowermost extremities are above the ground surface. This condition is shown in FIG. 6 of the drawings from which it will also be seen that the arched construction of the draw bars 86 is such that the inoperative transport position of the implement combination can readily be attained without either draw bar 86 fouling the raised ground roller 38 of the soil cultivating implement.

It is considered to be self-evident that, although the soil cultivating implement has been described as being used in combination with two further implements in the form of the seed drills 87, this is by no means essential and the combinations could equally well comprise only a single further implement or more than two such further implements. The fore and aft position that is occupied by the coupling point between the or each further implement and the soil cultivating implement, together with the construction of the or each coupling point, is most effective in enabling the implement combination to continue operating in a substantially optimum manner even when the combination is being manoeuvred through a steep or shallow bend to either the left or the right.

Although various features of the soil cultivating implement and its combination with two further implements that have been described and/or that are illustrated in the accompanying drawings will be set forth in the following claims as inventive features, it is emphasised that the invention is not necessarily limited to those features and that it includes within its scope each of the parts of the soil cultivating implement and of its combination with two further implements that has been described, and/or that is illustrated in the accompanying drawings, both individually and in various combinations.

What we claim is:

1. A soil cultivating implement comprising a frame and a plurality of soil working members journalled on an elongated portion of said frame, said portion extending transverse to the direction of implement travel, supporting roller means being positioned to the rear of said portion and interconnected to said frame with adjusting means that regulates the working depths of the soil working members, pivotal means located on said frame portion and said pivotal means comprising two spaced coupling points on top of said frame portion for connection to further implement means, each point defining an upwardly extending axis about which said implement means is pivotable when connected to that point, said two coupling points being located in advance of said roller means with respect to the direction of travel, and above said soil working members, said points being positioned at opposite sides of the center of said frame portion.

2. An implement as claimed in claim 1, wherein further respective implements are connected to said two points by bars that extend rearwardly from said points to the further implements positioned rearwardly of the roller means.

3. An implement as claimed in claim 2, wherein each coupling point includes a bracket mounted on top of said frame portion, said bracket being positioned to receive a pin that defines an upwardly extending axis.

4. An implement as claimed in claim 3, wherein at least one of said further implements is structured to deliver material into and/or onto the ground, said one implement having an arched draw bar that is connected to its respective coupling point.

5. A combination as claimed in claim 4, wherein each further implement has an arched draw bar located substantially centrally across the width of the further implement and two spaced apart ground wheels support that implement.

6. An implement as claimed in claim 5, wherein each further implement comprises a hopper that extends transverse to the direction of travel, said hopper being bevelled at its adjacent ends and at the front thereof.

7. An implement as claimed in claim 6, wherein the bottom of each hopper has a plurality of material delivery members movably connected to it, means automatically raising said delivery members relative to the ground surface when said frame portion is raised by said lifting device.

8. An implement as claimed in claim 7, wherein said delivery members are carried on a common support of the further implement and said common support being displaceable upwardly against resilient opposition.

9. An implement as claimed in claim 8, wherein said common support is connected to a rocker which, in turn, is connected by said control member to an anchorage on said frame portion.

10. An implement as claimed in claim 9, wherein said anchorage is located adjacent said coupling point.

11. A soil cultivating implement comprising a frame and a plurality of soil working members journalled on an elongated portion of said frame, said members being mounted in a row and said portion extending transverse to the direction of implement travel, supporting roller means being positioned to the rear of said portion and interconnected to said frame with adjusting means that regulates the working depths of the soil working members, pivotal coupling means located on said frame portion and said coupling means comprising two spaced apart coupling points on top of said frame portion for connection to further implement means, each coupling point defining an upwardly extending axis to which said implement means is pivotable when connected to that point, said two coupling points being located in advance of said roller means with respect to the direction of travel and adjacent a plane containing the axes of rotation of said soil working members, said points being positioned at opposite sides of the center of said portion and at substantially equal distances from that center.

* * * * *